Patented Feb. 14, 1933

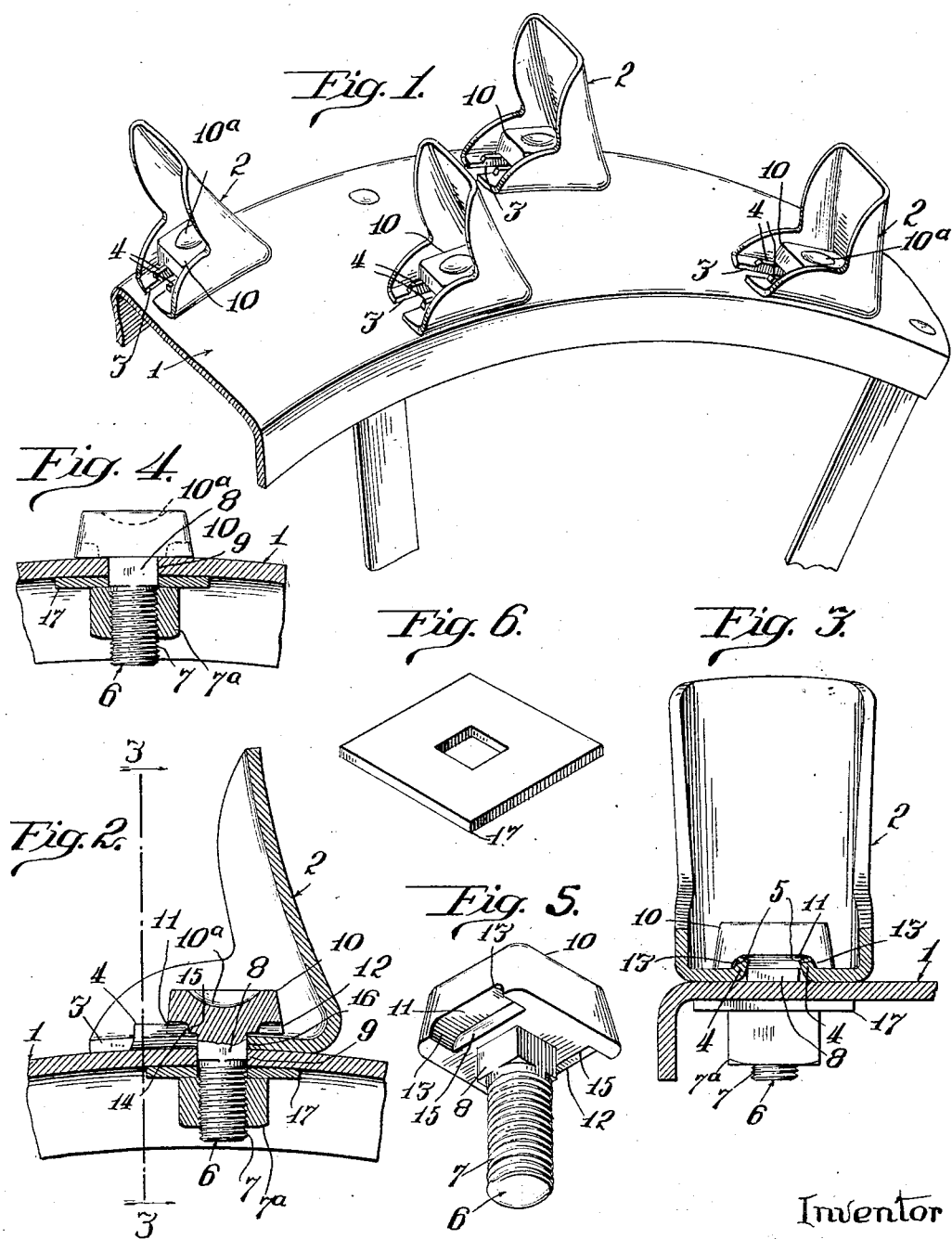

1,897,751

UNITED STATES PATENT OFFICE

THEOPHILUS BROWN, OF MOLINE, ILLINOIS, ASSIGNOR TO DEERE & COMPANY, OF MOLINE, ILLINOIS, A CORPORATION OF ILLINOIS

TRACTOR

Application filed June 23, 1930. Serial No. 463,031.

The present invention relates generally to tractors of the motor driven type and more particularly to an improved form of traction wheel and lug for such a tractor.

More specifically, the present invention is concerned with the provision of an improved lug of the spade type for the traction wheel of the tractor which may be quickly and conveniently removed by merely loosening the securing means which holds the lug to the wheel without having to entirely remove the securing means from the wheel rim.

Removable lugs per se are not new in the art but, so far as I am aware, it has always been necessary heretofore to provide some form of auxiliary means for holding the lug in proper position on the rim of the drive wheel and furthermore, particularly in the case of slotted lugs, no means or method has been developed which is satisfactorily effective in preventing spreading and other deformation of the lug under the traction loads imposed thereon during the life of a tractor.

The principal object, therefore, of the present invention is the provision of an improved lug structure for the traction or drive wheels of a tractor which can be quickly and conveniently detached and, furthermore, when attached to the wheel rim such lug structure is securely held in proper position on the wheel rim and in such a manner that spreading and other deformation under load is practically eliminated.

Another feature of the present invention is the provision of improved securing means for removable traction lugs, which securing means is preferably so constructed and arranged that it may be used as lugs when the removable lugs are detached.

Other objects and advantages of my invention will be apparent to those skilled in the art after a consideration of the following detailed description of the preferred embodiment of the present invention which is illustrated in the accompanying drawing, in which:

Figure 1 is a fragmentary perspective view showing a portion of a traction wheel provided with lugs made in accordance with the present invention;

Figure 2 is a longitudinal cross-section through one of the lugs and the immediate portion of the wheel rim;

Figure 3 is a view partly in cross-section and partly in elevation and corresponding to a view taken along the line 3—3 of Figure 2;

Figure 4 is a view showing the improved lug securing means with the removable lug detached and with the securing means arranged to act as a lug;

Figure 5 is a perspective view of the bolt of the improved lug securing means and illustrating certain details of the bolt; and Figure 6 is a perspective of the squared plate forming a part of the lug securing means shown in Figure 4.

Referring now to the drawing, the reference numeral 1 indicates a portion of the traction wheel of a tractor which is provided with a series of spade lugs 2. In general configuration these lugs 2 are similar to the commercial form of a spade lug in considerable use at the present time. From the drawing, however, it will be noted that the base portions of these lugs 2 are each provided with a slot 3 having an open end and a portion of the inner sides of the slot 3 extending parallel to one another and bent upwardly to form flanges 4 near the open end just mentioned. These flanges 4 extend almost at right angles to the plane of the base portion of the lugs. These flanges 4 are, however, inclined sufficiently so as to provide upwardly converging surfaces 5 for a purpose later to be described. Preferably the base portions of the lugs 2 are curved to conform to the circumference of the curved rim 1 of the traction wheel.

Each lug 2 is held in position on the rim of the wheel 1 by means of a bolt 6 threaded at its lower end 7 to receive a nut 7a. The bolt 6 is provided with a squared portion 8 just underneath the head, and this squared section is adapted to closely fit into a square hole 9 in the rim of the wheel 1. The head 10 of the bolt 6 is enlarged and may be shaped in any desired manner for the purpose of serving as a lug when the spade lug 2 is removed. Preferably, and as shown in the drawing, the head 10 of the bolt 6 is considerably thickened and shaped to provide a portion of square contour having centrally thereof a shallow depression 10a. It is to be understood, of course, that any other desired shape or form of bolt head may be employed, the only requirement being that such head be so constructed as to be capable of serving as a lug when the removable spade lug is detached.

As thus shown in Figure 5, the underside of the head 10 is provided with two recesses 11 and 12, each having outwardly diverging inclined sides 13 which are adapted to contact with the outer sides 5 of the flanges 4. By reason of this camming engagement of the surfaces 13 with the surfaces 5 the tightening of the nut 7a urges the two sides of the slot 3 together, thereby preventing the lug from separating at this point under the stress of traction loads.

The inner ends of the flanges 4 have a vertical termination shown at 14 which is adapted to abut against the end 15 of the recess 11. This prevents any movement of the lug 2 longitudinally of the slot 3. The rear end 16 of the slot 3 bears against one side of the squared portion 8 to prevent movement in the opposite direction.

The slot 12 is identical with the slot 11, the two slots being provided so that the bolt may be placed in position in either one of two positions so that less attention may be paid in the insertion of the lug in the opening 9.

A square plate 17 is interposed between the under side of rim 1 and nut 7 for the purpose of building up the space between the head of the bolt and the beginning of the threads 7 when the bolt is used as a lug with the spade lug removed, as shown in Figure 4. This plate also serves as a lock washer.

When it is desired for any reason to remove the spade lugs 2 from the tractor wheel 1, all that is necessary to do is to loosen the nut 7a on each of the bolts 7 just enough to free the lugs 2. It is then an easy matter to get the lugs 2 from underneath the head 10, moving the lugs 2 to the right, as viewed in Figure 1. After all of these lugs 2 are thus removed the nuts 7a may then be tightened drawing the head 10 of the bolts 7 tightly against the wheel 1, as illustrated in Figure 4. From that figure it will also be noted that the thickness of the plate or washer 17 is sufficient to prevent the nut 7a from jamming against the squared neck portion 8 of the bolt 7. If the bolts 7 were always to be used as illustrated in Figure 4 it would not be necessary for the neck portion 8 to be of the length shown. Since, however, the neck 8 must be long enough when the spade lug 2 is applied to pass through the slots 3 and into the squared hole 9 in the rim of the wheel 1, some means must be interposed between the inside of the rim and the nut to prevent the latter from striking the neck 8 before tightening the bolt 6. The plate 17 is a simple and inexpensive means whereby this is accomplished. When thus arranged the securing means adapted to hold the lug 2 in place and against displacement may itself, when the lug 2 is removed, be employed as lugs or traction increasing cleats, and it is to be understood that the thickened head 10 may be provided with traction increasing means other than the depressions 10a if desired.

While I have shown and described in connection with the accompanying drawing the preferred embodiment of my invention, it is to be understood that my invention is not to be limited to the specific structure shown and described but that, in fact, widely different means may be employed in the practice of the broader aspects of my invention as defined in the appended claims.

What I claim, therefore, and desire to secure by Letters Patent is:

1. A tractor wheel lug comprising a slotted base, an upstanding tip portion connected to the base, bolt means received in the slot and adapted to secure the lug to the wheel, and cooperating means formed on the bolt means and said base and operative to positively lock said lug against spreading at the slot under traction stresses.

2. A grouser structure for drive wheels of tractors and the like, comprising a lug having a slotted base and an upstanding earth engaging tip, the sides of said slot being parallel and having outwardly directed flanges and securing means comprising a member formed to embrace said flanges and adapted to clamp said lug to the wheel whereby to prevent spreading of the lug at the slot under traction stresses.

3. A grouser structure for drive wheels of tractors and the like, comprising a lug having a slotted base and an upstanding earth engaging tip, the sides of said slot being parallel and having outwardly directed flanges, and securing means for the lug comprising a member formed to embrace said flanges, there being cooperating cam surfaces on said member and flanges, said member when tightened on the wheel being adapted to clamp the lug to the wheel and to prevent spreading of the lug at the slot under load.

4. A grouser structure for traction wheels having rims, comprising a spade lug having a base fitting the rim and provided with a slot extending in a peripheral direction relative to the rim, said slot having parallel upstanding flanges near one end thereof extending outwardly relative to said base, and bolt means having a head provided with a recess providing shoulders contacting with the sides and ends of said flanges and adapted to extend through said slot to clamp the lug to the wheel, the abutment of the ends of said flanges preventing endwise displacement of the lug, and the reception of the sides of said flange within the recess preventing spreading of the lug at the slot under traction stresses.

5. A tractor wheel lug comprising a base portion, a tip portion, side webs joining the tip and base portions, said base portion having a slot open at one end and provided with upstanding flanges, and bolt means passing through said slot and adapted to removably secure the lug to the wheel, said bolt means including an enlarged head having a recess in one side thereof, said recess having inclined side walls and a back wall, the latter wall engaging the ends of said flanges to prevent endwise movement of the lug and the inclined side walls being adapted to have camming engagement with the sides of said flanges, thereby tending to draw the sides of said slot together when the bolt means is tightened and to prevent the lug from separating at the slot under load.

6. A tractor wheel lug comprising a base portion, a tip portion, side webs joining the tip and base portions, said base portion having a slot open at one end and extending inwardly thereof, said base provided with upstanding flanges lying intermediate the open end and the inner end of said slot, and bolt means passing through said slot and adapted to removably secure the lug to the wheel, said bolt means including an enlarged head having a plurality of recesses in the sides thereof, each of said recesses having inclined side walls and a back wall, the latter wall engaging the ends of said flanges to prevent endwise movement of the lug and the inclined side walls being adapted to have camming engagement with the sides of said flanges, thereby tending to draw the sides of said slot together when the bolt means is tightened and to prevent the lug from separating at the slot under load, each of said recesses being optionally engageable with the flanges of the slot.

7. An open spade lug for a traction wheel, comprising a base portion, an outwardly extending tip portion, and side webs joining the tip portion with said base portion, said base portion being curved on an arc to rest flatly on the outer periphery of said wheel, said base portion having a slot extending longitudinally thereof, the edges of the slot having outwardly turned flange members, and a member for securing said lug on the wheel and comprising a head portion adapted to clench said flange members to thereby prevent spreading of the lug at the slot under traction stresses.

8. An open spade lug for a traction wheel, comprising a curved base portion to fit flatly on the outer periphery of said wheel, an aperture in said wheel located beneath said base portion, an outwardly extending tip portion at one end of said base portion and webs joining the sides of said tip portion with the sides of said base portion, said base portion having a slot in the opposite end thereof and extending inwardly a determined extent, outwardly extending flange members formed on said base portion adjacent the opposite edges of said slot, and a bolt means extending through said slot and the aperture in said wheel to clamp the lug thereon, said bolt means including an enlarged head having a recess in one side thereof, said recess having inclined side walls and a back wall, the latter wall engaging the ends of said flanges to prevent endwise movement of the lug and the inclined side walls being adapted to clench the sides of said flanges thereby tending to draw the sides of said slot together when the bolt means is tightened and to prevent the lug from spreading at the slot under load.

In witness whereof, I hereunto subscribe my name this 20th day of June, 1930.

THEOPHILUS BROWN.